US011487025B1

(12) United States Patent
Meyer et al.

(10) Patent No.: US 11,487,025 B1
(45) Date of Patent: Nov. 1, 2022

(54) METHOD FOR INFERRING GPS LOCATION (71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, San Antonio, TX (US); Christopher Russell, San Antonio, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 285 days.

(21) Appl. No.: 16/831,903

(22) Filed: Mar. 27, 2020

Related U.S. Application Data (60) Provisional application No. 62/826,079, filed on Mar. 29, 2019.

(51) Int. Cl.
G01S 19/50 (2010.01)
G01S 19/45 (2010.01)
G01S 19/47 (2010.01)
G01S 19/37 (2010.01)

(52) U.S. Cl.
CPC ............. *G01S 19/50* (2013.01); *G01S 19/45* (2013.01); *G01S 19/47* (2013.01); *G01S 19/37* (2013.01)

(58) Field of Classification Search
CPC ........ G01S 19/252; G01S 19/42; G01S 19/50; G01S 19/45–47
See application file for complete search history.

(56) References Cited

U.S. PATENT DOCUMENTS

| 5,867,122 A * | 2/1999 | Zahm ...................... G01S 19/14 701/472 |
| 5,890,090 A * | 3/1999 | Nelson, Jr. .............. G01S 19/50 701/472 |
| 5,977,909 A * | 11/1999 | Harrison ................. G01S 19/09 342/357.33 |
| 6,590,530 B2 * | 7/2003 | van Diggelen ......... G01S 19/50 342/357.33 |
| 6,657,584 B2 * | 12/2003 | Cavallaro ............. G01S 5/0027 342/357.61 |
| 6,894,645 B1 * | 5/2005 | Akopian ................. G01S 19/25 342/464 |
| 7,492,315 B2 * | 2/2009 | Verechtchiagine ..... G01S 19/42 342/357.33 |

(Continued)

FOREIGN PATENT DOCUMENTS

GB          2180426 A * 3/1987 ............. G01S 19/11

Primary Examiner — Gregory C. Issing
(74) Attorney, Agent, or Firm — Plumsea Law Group, LLC (57) ABSTRACT A method of inferring the GPS location of a device with a GPS receiver is disclosed. The method includes using signals from two GPS satellites to determine two candidate GPS locations. Geographic information can be used to estimate the probability that the device is at each location. If one of the two candidate GPS locations has a substantially higher probability of being the correct location, that location may be selected as the inferred GPS location. The method may also include making use of additional sensed data that could be provided using sensors onboard the device.

20 Claims, 10 Drawing Sheets

(56) References Cited

U.S. PATENT DOCUMENTS

| | | | | |
|---|---|---|---|---|
| 7,602,339 B2 * | 10/2009 | Fullerton | G01S 5/0289 342/465 |
| 8,188,912 B1 * | 5/2012 | Weisenburger | G01S 19/45 342/357.24 |
| 8,692,710 B2 * | 4/2014 | Tarlow | G01S 19/25 701/412 |
| 8,779,980 B2 * | 7/2014 | Yule | G01S 5/0252 342/451 |
| 2008/0234928 A1 * | 9/2008 | Matsuoka | H04M 1/72427 701/465 |

* cited by examiner

METHOD FOR INFERRING GPS LOCATION

CROSS-REFERENCE TO RELATED APPLICATIONS

This application claims the benefit of Provisional Patent Application No. 62/826,079 filed Mar. 29, 2019, and titled "Method for Inferring GPS Location," which is incorporated by reference herein in its entirety.

TECHNICAL FIELD

The present disclosure generally relates a method for inferring GPS location, and specifically to a method for inferring GPS location when an insufficient number of satellites are visible.

BACKGROUND

Many devices and systems rely on the satellite based Global Positioning System (GPS) to determine a location for the device or system with a high degree of accuracy and precision. In order to determine a GPS location (also called a GPS position), a device must receive signals from at least three GPS satellites simultaneously to obtain a position on a two-dimensional surface (e.g., the obtain latitude and longitude), or signals from at least three GPS satellites simultaneously to obtain a position in a three-dimensional space (e.g., to obtain latitude, longitude, and altitude). However, in some geographic areas, such as mountainous regions or so-called "urban canyons", it may be difficult at times for a device to receive signals from at least three GPS satellites.

There is a need in the art for a system and method that addresses the shortcomings discussed above.

SUMMARY

In one aspect, a method of inferring GPS location for a device including a GPS receiver includes steps of receiving a first GPS signal from a first GPS satellite, receiving a second GPS signal from a second GPS satellite, determining a first candidate GPS location and a second candidate GPS location for the device based on the first GPS signal and the second GPS signal, retrieving geographic information corresponding to the first candidate GPS location and to the second candidate GPS location, and using the geographic information to determine that the user is more likely to be located at the first candidate GPS location than at the second candidate GPS location In another aspect, a method of inferring GPS location for a device with a GPS receiver and at least one sensor includes steps of receiving a first GPS signal from a first GPS satellite, receiving a second GPS signal from a second GPS satellite, and determining a first candidate GPS location and a second candidate GPS location for the device based on the first GPS signal and the second GPS signal. The method also includes retrieving geographic information corresponding to the first candidate GPS location and to the second candidate GPS location, receiving sensed information from the at least one sensor, and using the geographic information and the sensed information to determine that the user is more likely to be located at the first candidate GPS location than at the second candidate GPS location.

In another aspect, a method of inferring GPS location for a device including a GPS receiver includes steps of determining, at a first time, an initial GPS location using information from at least a first GPS signal and a second GPS signal, and receiving heading information. The method also includes steps of receiving, at a second time, a third GPS signal, where the second time occurs after the first time, and determining a set of candidate GPS locations using the third GPS signal. The method also includes a step of determining a most probable current GPS location from the set of candidate GPS locations using the initial GPS location and the heading information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide a method for inferring the GPS location (or position) of a device when an insufficient number of GPS satellite signals are available. The method uses available GPS signals to determine two candidate GPS locations. Geographic information for each candidate GPS location is then analyzed to see if either candidate location can be ruled out, due, for example, to a high likelihood that one or other of the locations are difficult to access. For example, if one of the candidate locations is in the middle of a body of water, atop a mountain, or in a barren area, the location could be ruled out. The method may assign probabilities to each location based on geographic information for each location. If one of the locations has a substantially higher probability of being the correct location then the method may select that location. Additional information, including sensed information, can be used to further determine if one of the locations can be ruled out. For example, acceleration information can be used to determine if a device is likely on a roadway. As another example, information from a gyroscope may be used to determine if a device is at a relatively high altitude, and thus whether the device may be at the top of a mountain. By using geographic information and/or sensed information to infer a GPS location, the GPS location of a device can be inferred in mountains regions, urban canyons, or other areas where GPS location is difficult to determine due to line of sight issues between a GPS receiver and GPS satellites.

Figure 1:
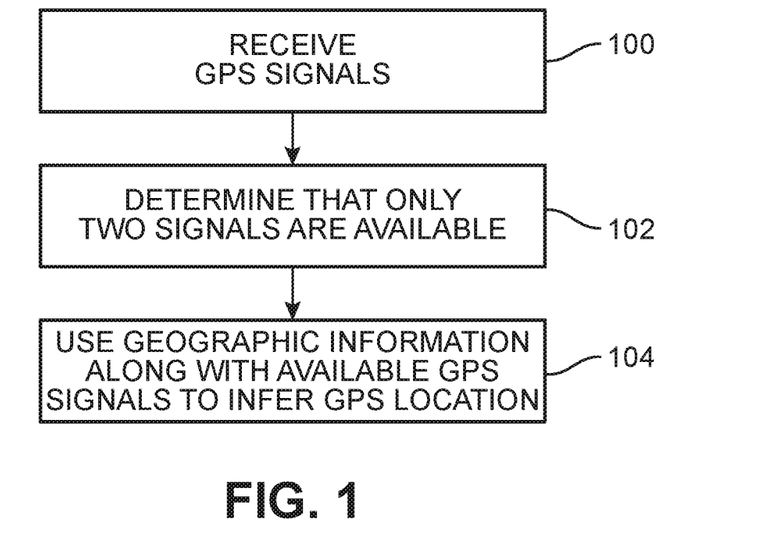
FIG. 1 is a process for inferring GPS location using geographic information along with two GPS signals, according to an embodiment.

FIG. 1 is a process for inferring GPS location (also referred to as GPS position) when only two GPS satellite signals are available. These steps may be performed by any system or device that needs to determine its GPS location (position). Examples of such devices include smartphones, tablets, computer systems in various kinds of vehicles, or any other systems. Any such devices may be configured with at least a GPS receiver for receiving GPS information and access to mapping information. Mapping information may be retrieved from a local database, or could be retrieved from a remote database over the internet or other network.

In a first step 100, software running on a device may receive one or more GPS signals. The software may be capable of determining a GPS location using GPS information. A GPS signal from a GPS satellite may be received when the GPS satellite is within line of sight of the receiving device (such as a smartphone). In order to accurately determine the GPS location of the device, signals from at least three different GPS satellites are needed. That is, the device must be within line of sight of at least three different GPS satellites. However, the presence of large geographic or man-made features (for example, buildings) may interfere with line of sight and prevent a device from receiving at least three GPS signals.

In step 102, the software running on the device determines that only two signals are available. That is, there are not enough signals to determine an accurate GPS location using conventional methods. Instead, in step 104, the software running on the device uses geographic information along with the two available GPS signals to infer a GPS location. The specific methods used for inferring GPS location are described in further detail below and depicted schematically in FIGS. 2-9.

As used herein, the term "geographic information," may refer to a variety of different kinds of information. In some cases, geographic information can include any information stored and/or retrieved from a geographic information system (GIS). In other cases, geographic information may be stored and/or retrieved from a web mapping service. Exemplary types of geographic information include, but are not limited to: topographic information, cartographic information, and spatial information. Geographic information may further include geographic features. As used herein, the term geographic feature refers to a wide variety of features such as roads, cities, buildings, mountains, rivers, lakes, oceans, as well as other kinds of features. Geographic features may be characterized by their location and spatial extent, altitude (or height), and accessibility, as well as any other suitable characteristics.

Figure 2:
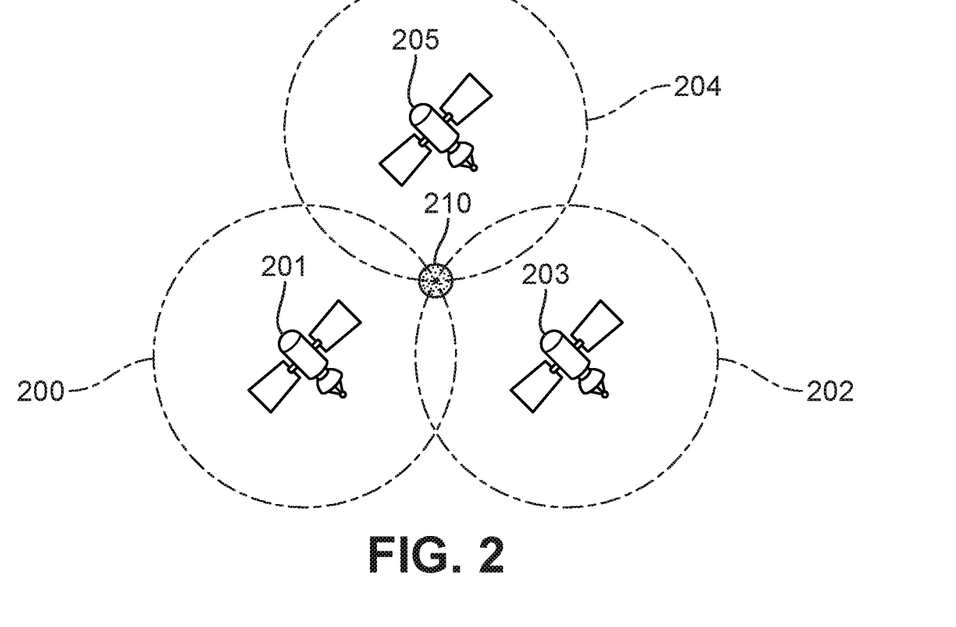
FIG. 2 is a schematic view of a process of using trilateration to determine a GPS location from three GPS signals, according to an embodiment.

FIG. 2 is a schematic view of a method of determining a GPS position using a process known as "trilateration." Using this process GPS information from three different GPS satellites allow a system to determine an accurate position on a two-dimensional surface as follows. A first signal sent from a first GPS satellite 201 can be used to determine where on a first circle 200 a GPS receiver may be located. This is because the received GPS signal includes information that can be used to determine the GPS receiver's distance from the satellite. Thus, the receiver must lie somewhere on the circle of locations that are all equidistant to the satellite (and by the amount determined from the received signal). Using a similar process for a signal received from a second GPS satellite 203, it can also be determined that the GPS receiver is also located somewhere on a second circle 202. Using information from a signal received from a third GPS satellite 205, it can also be determined that the GPS receiver is located somewhere along a third circle 204. Knowing that the GPS receiver is located somewhere on each of these circles, the system can deduce that the GPS receiver is disposed at a first location 210, adjacent to where the first circle 200, the second circle 202 and the third circle 204 all intersect. Of course, in practice, there is some error in associating the GPS receiver precisely along each circle, so that the location may only be known to some particular level of accuracy.

Figure 3:
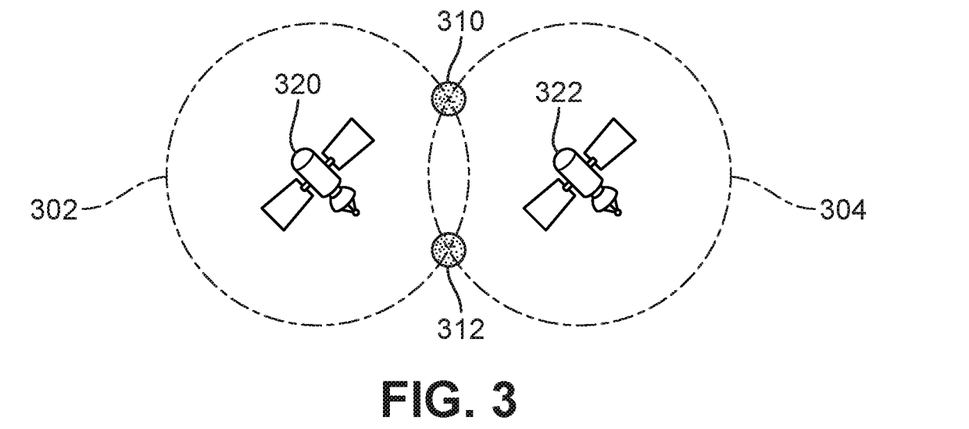
FIG. 3 is a schematic view of a configuration where GPS signals from only two GPS satellites are available, according to an embodiment.

FIG. 3 is a schematic view of a situation where a GPS receiver has line of sight to only two satellites (first GPS satellite 320 and second GPS satellite 322). In this case, it can be determined that the GPS receiver is somewhere on a first circle 302 and a second circle 304. But because these two circles intersect at two different locations, a first location 310 and a second location 312, the true position of the receiver cannot be determined. The exemplary method, discussed below, leverages geographic information and/or other kinds of sensed information, to infer a GPS location from two candidate locations such as those depicted schematically in FIG. 3.

Figure 4:
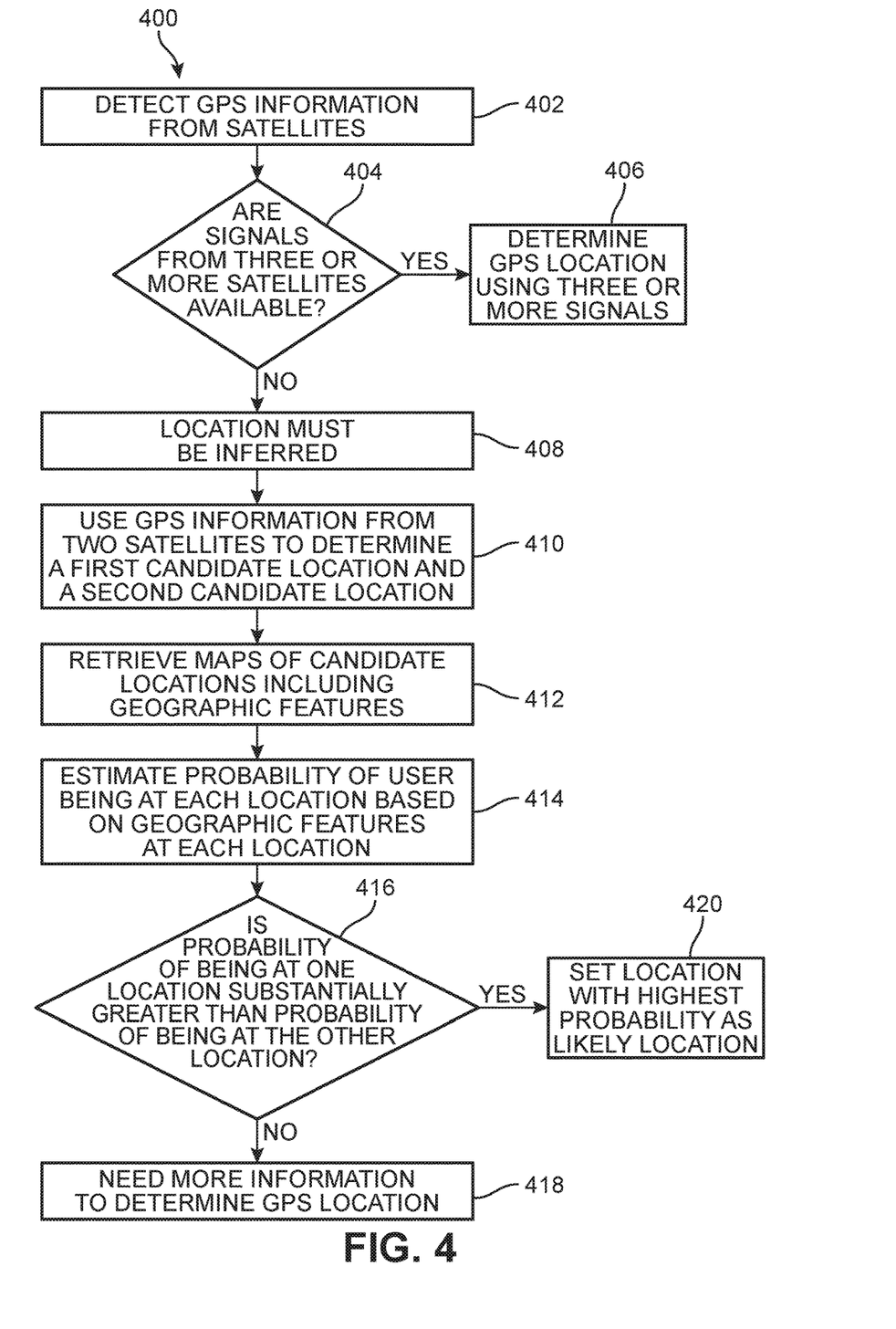
FIG. 4 is a process for inferring GPS location using geographic information along with two GPS signals, according to an embodiment.

FIG. 4 is a method 400 for inferring GPS location using geographic information and GPS information from two GPS satellites. The following steps could be performed by a system capable of determining a GPS location, which may be integrated into a device such as a smartphone, tablet, or other computing system. The system may comprise both hardware and software. The hardware may include a GPS receiver. The software may include algorithms for determining a GPS location from three or more satellites using conventional techniques, as well as one or more algorithms that can infer GPS location using geographic information along with information from only two GPS satellites.

In step 402, the system may detect GPS information from multiple satellites. Next, in step 404, the system determines if there are signals from three or more satellites. If so, the system proceeds to step 406 to determine a GPS location for the associated device using conventional trilateration techniques.

If there are not signals from three or more satellites, the system proceeds to step 408. Here, the system determines that the GPS location must be inferred using additional information beyond only the satellites signals themselves.

Next, in step 410, the system may use GPS information from two satellites to determine a first candidate location and a second candidate location, similar to the manner that first location 310 and second location 312 were identified in the situation shown schematically in FIG. 3. Following this, in step 412, the system may retrieve maps of the two candidate locations. The maps can include candidate features. Of course, if the candidate locations are close enough, a single map may be used.

In step 414, the system estimates the probability of the user (that is, the user of the device) being at each location (the first and second candidate locations) based on geographic features at each location. Examples of this step are described in further detail below and shown, for example, in FIGS. 5-6.

In step 416, the system determines if the probability of being at one location is substantially greater than the probability of being at the other location. As used herein, "substantially greater" may mean that the difference of the two probabilities is greater than a predetermined threshold. For example, the threshold could be 20%, so that if the probability of being at the first location is 81% and the probability of being at the second is 59%, than the probability of being at the first location is substantially greater (by the exemplary threshold) than the probability of being at the second location.

If the system determines that the probability of being at one location is substantially greater than the probability of being at the other location, the system proceeds to step 420. In step 420, the system sets the location with the highest probability as the likely location and provides that GPS location to a user or another system requiring a GPS location for the device.

If the system determines that neither probability is substantially greater than the other, then the system proceeds to step 418. In step 418, the system determines that more information is needed to determine a GPS location. The system may then give an error, or follow a similar protocol to that when a conventional GPS location system is unable to obtain a signal from at least three different satellites.

Figure 5:
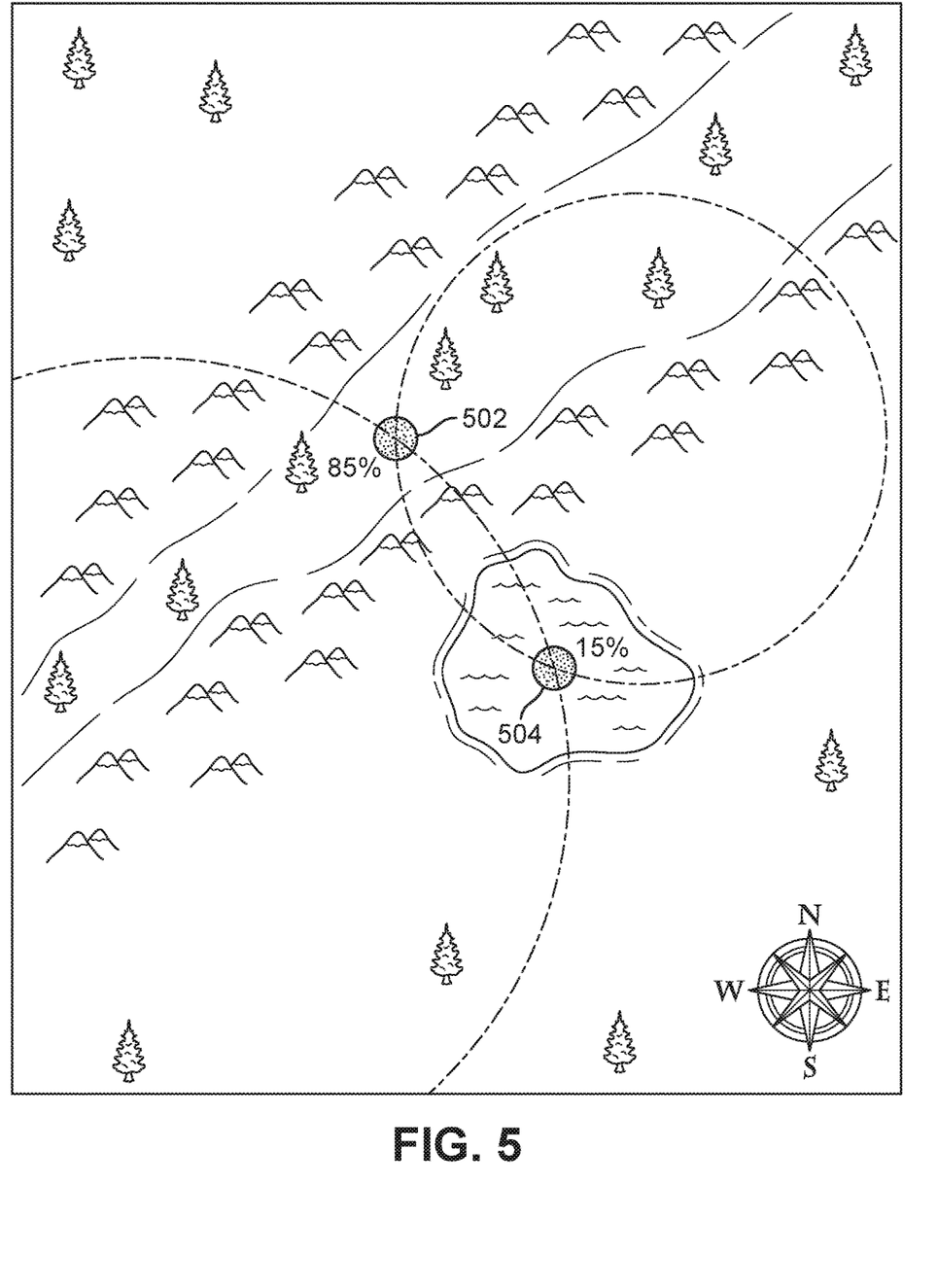
FIG. 5 is a schematic view of a scenario where geographic information can be used to infer a GPS location from two satellite signals, according to an embodiment.

FIG. 5 is a schematic view of a scenario where the exemplary GPS inference system can be used. Such an example may be exemplary of situations where a user is in a remote area with mountains or other geographic features that can block line of sight to one or more GPS satellites. In this scenario, using signals from two GPS satellites, a system determines a first candidate location 502 and a second candidate location 504. Because the system does not have information from a third GPS satellite, the true location cannot be determined from trilateration. However, the system can use geographic information to estimate the probability that the user is at either location. In this case, the system identifies that second candidate location 504 is in the middle of a known lake. Because a user is unlikely to be in the middle of a lake, unless they are on a boat, the system estimates the probability that the user is at the second candidate location 504 as 15%. Meanwhile, the first candidate location 502 is in a valley between mountains, and the system estimates a high likelihood that the user is here, with a probability of 85%. Because the probability of being at first candidate location 502 is substantially greater than being at second candidate location 504, the GPS inference system is able to correctly determine that the user is at first candidate location 502.

Figure 6:
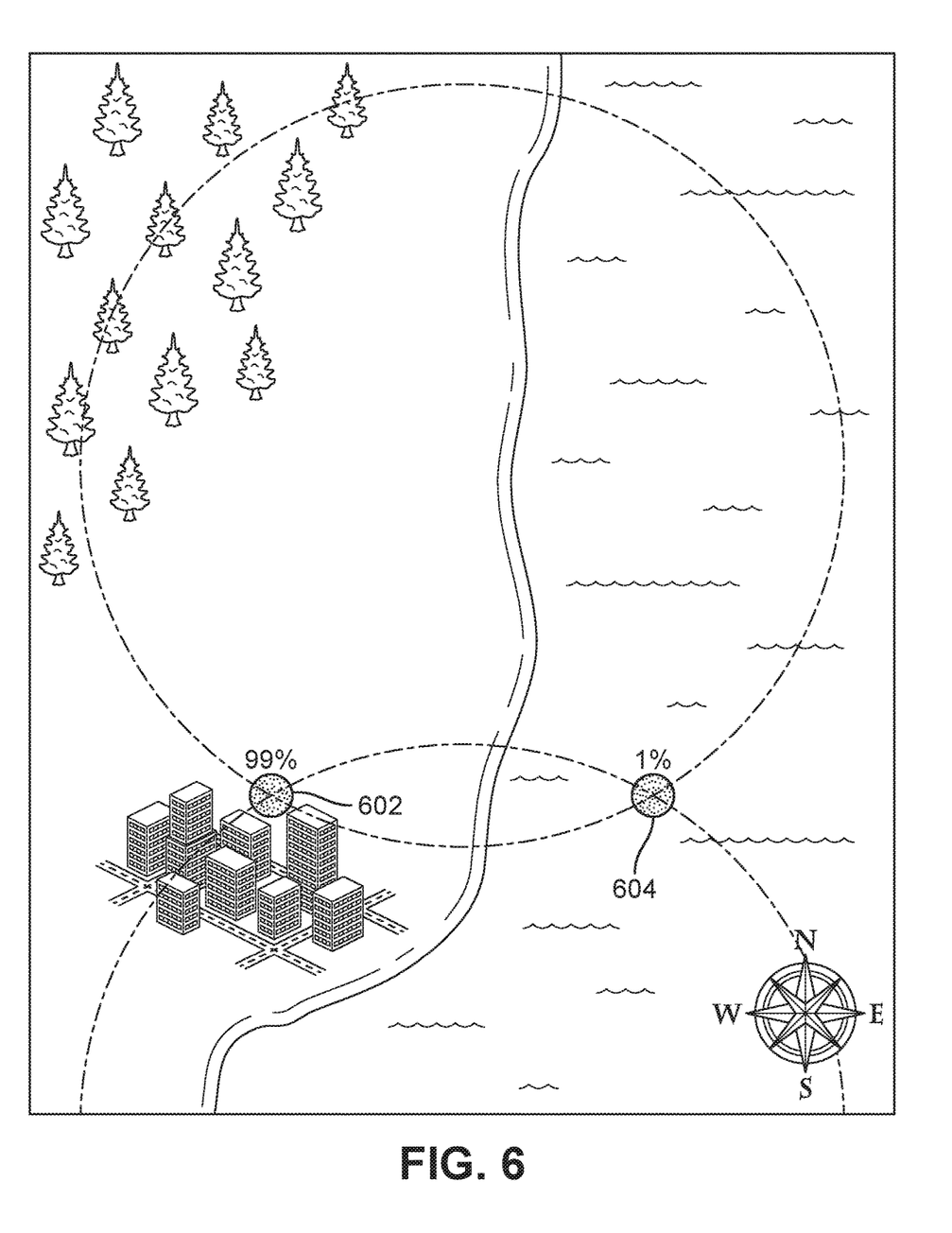
FIG. 6 is a schematic view of another scenario where geographic information can be used to infer a GPS location from two satellite signals, according to an embodiment.

In another scenario, depicted in FIG. 6, a system is able to estimate that a user is most likely at a first location 602 (with probability 99%) than at a second location 604 (with probability 1%). The system estimates these probabilities based on geographic information. Specifically, first location 602 is in a city and second location 604 is many miles off the coastline. In some cases, a system could use historic GPS information to improve estimations. For example, in the scenario of FIG. 6, the system could see that a user is often in the city and has never previously been in a boat off the coastline.

Figure 7:
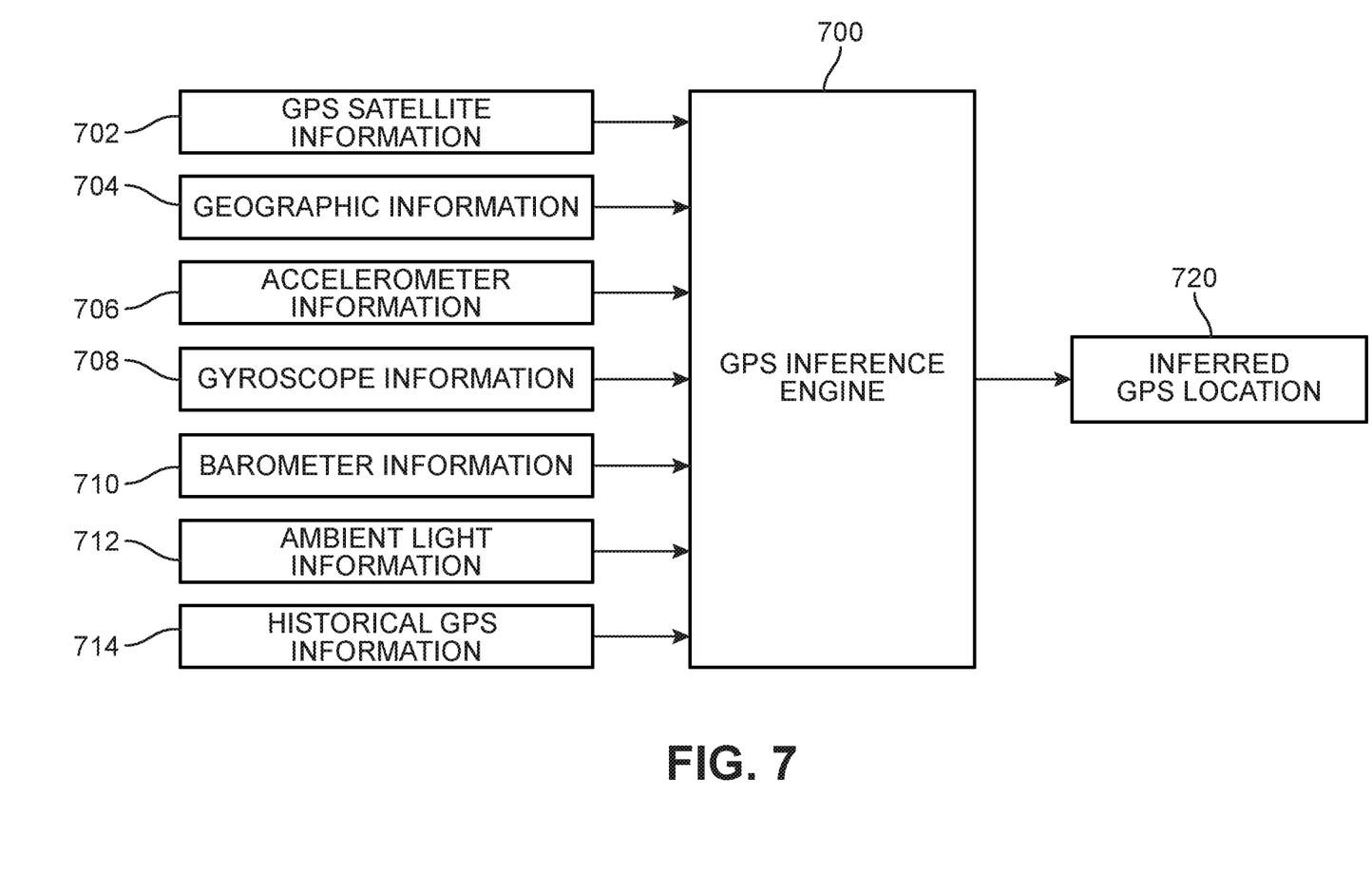
FIG. 7 is a schematic view of a GPS inference engine, according to an embodiment.

In still other embodiments, a GPS inference system (or GPS inference engine) could use still other kinds of information. In FIG. 7, for example, a GPS inference engine 700 could receive GPS satellite information 702 and geographic information 704. GPS inference engine 700 could also use sensed information. Sensed information could be determined using one or more sensors on a device that includes a GPS receiver, such as a smartphone. Sensed information could include acceleration information 706, gyroscope information 708, barometer information 710, and ambient light information 712. Based on some or all of this information, GPS inference engine 700 may determine an inferred GPS location 720.

It is contemplated that in some embodiments, a GPS inference system could also make use of historical GPS information 714 as input. Historical GPS information may include both recent GPS information that has been acquired by the device, as well as GPS information that has been received from other devices and systems (such as a database). For example, candidate GPS locations can be compared to recent GPS information, including one or more recent GPS locations for the device. In some cases, if one of the recent GPS locations is sufficiently close to one of the candidate GPS locations, a system could infer that this candidate GPS location is the correct location. In another example, GPS locations along known roads or trails could be stored in a database, including a locally accessible database. If the device is able to determine that a user is initially traveling on a road or trail, the device could compare candidate GPS locations with the set of known GPS locations along the road or trail. This may be useful even when the previous GPS location has not been checked recently. For example, suppose a user starts out a road trip and enters a navigation route corresponding to a cross-country highway. If the user turns off his or her navigation device (with a GPS receiver) for a while and then turns it back on at a later time in a location without sufficient satellite reception, a GPS inference system can still infer a location by comparing candidate GPS locations with known GPS locations along the highway. That is, the system can infer a GPS location by assuming the user has stayed on the planned navigation route with a set of known GPS locations.

Figure 8:
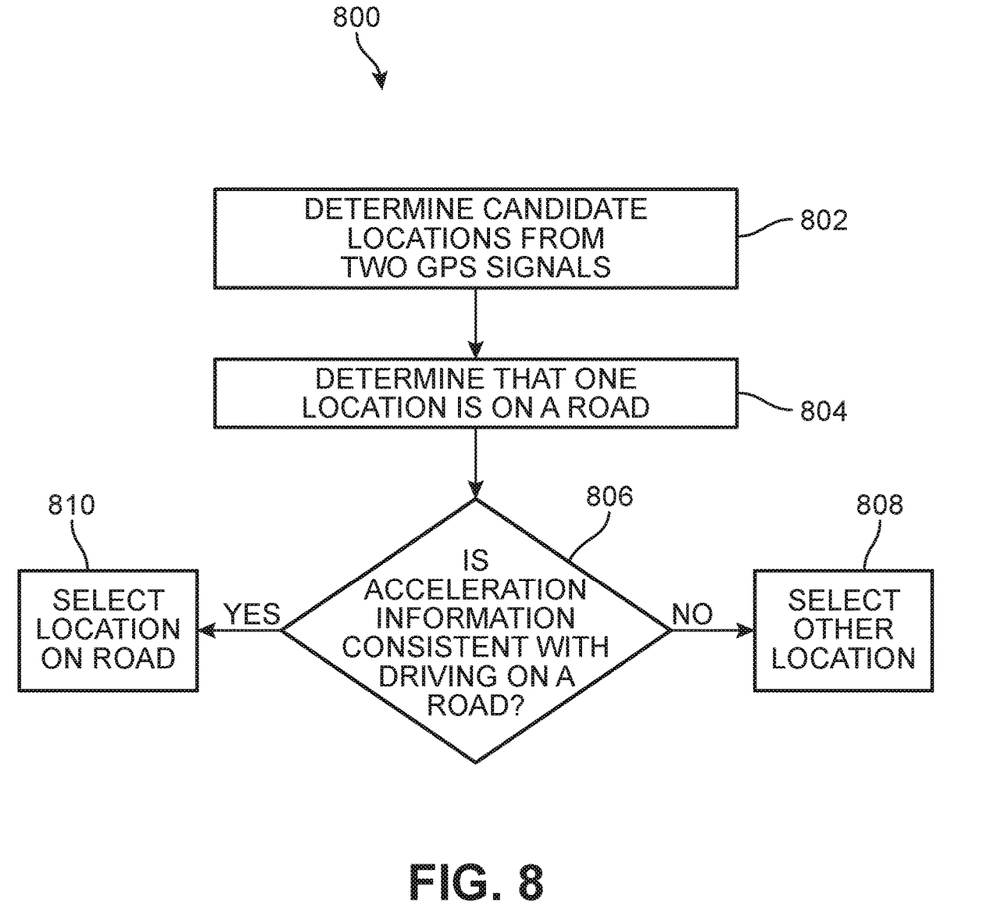
FIG. 8 is a process for inferring GPS location for a device using acceleration information sensed by the device, according to an embodiment.

FIG. 8 is an example of a process 800 that uses acceleration information (for example, from a smartphone acceleration sensor) along with GPS information and geographic information to infer a GPS location. In a step 802, a GPS inference engine can determine candidate locations based on two GPS signals, as described above. In step 804, the GPS inference system can determine that one of the two candidate locations (but not the other) is on a road. That is, the GPS inference system can use geographic information to determine that one candidate location is along a road.

In step 806, the GPS inference system determines if acceleration information from the acceleration sensor on the smartphone (or other device) is consistent with driving on a road. If so, the GPS inference system selects the location that is on the roadway as the correct GPS location in step 810. Otherwise, the GPS inference system selects the other location in step 808.

Similar algorithms can be used by an inference system to infer GPS based on other kinds of sensed information, including sensed information from one or more sensors described above. For example, an algorithm can infer the probability that a user is or is not on a mountain top using information from a gyroscope and/or barometer, thereby possibly allowing the algorithm to rule out one of two candidate locations. As another example, an algorithm can infer that a user is or is not indoors based on information from an ambient light sensor, thereby possibly allowing the algorithm to rule out one of two candidate locations.

Figure 9:
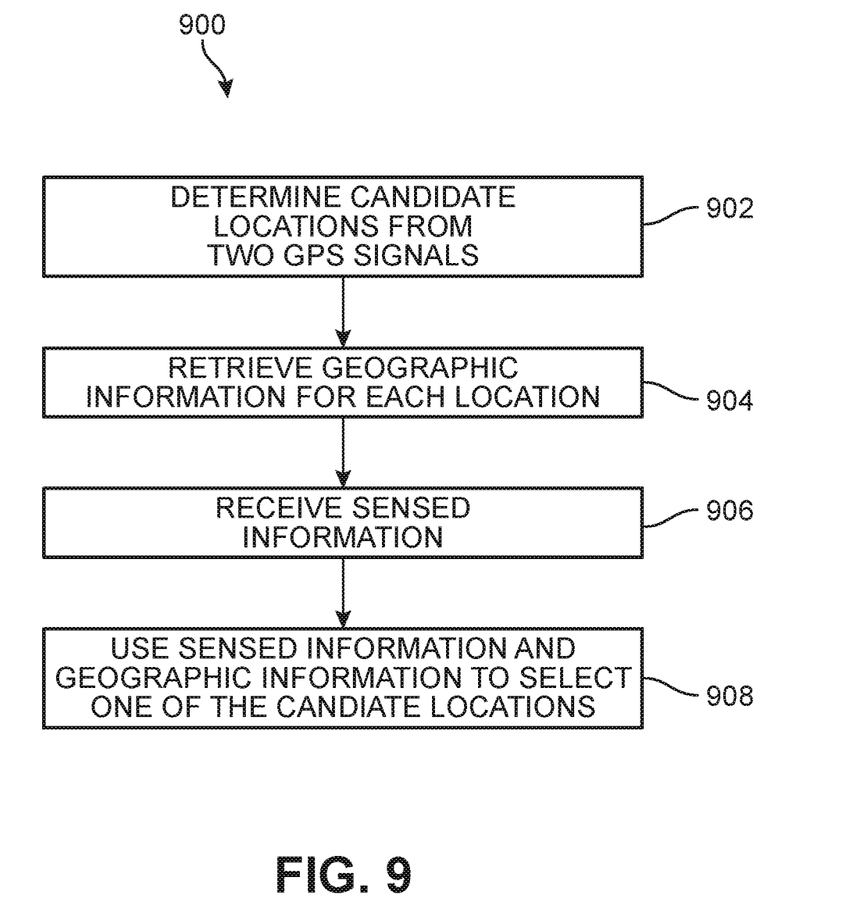
FIG. 9 is a process for inferring GPS location for a device using sensed information from a sensor associated with a device, according to an embodiment.

FIG. 9 depicts a general process 900 for using sensed information and geographic information to select one of two candidate GPS locations, according to an embodiment. In a first step 902, two candidate GPS locations are determined using two GPS signals. Next, in step 904, geographic information for each location is retrieved. In step 906, sensed information can be received by one or more sensors. Examples of sensed information that could be retrieved include any of the sensed information described above and indicated in FIG. 7. In step 908, the sensed information is used with the geographic information to select one of the candidate GPS locations.

Figure 10:
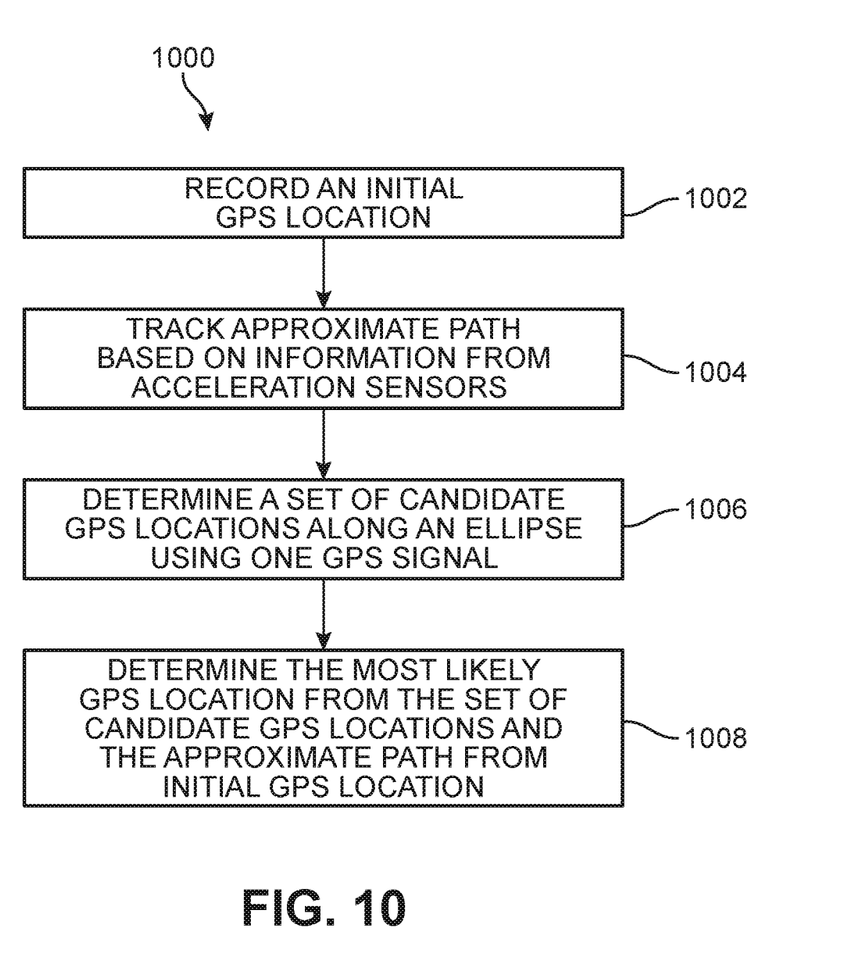
FIG. 10 is a process for inferring GPS location when only one GPS signal is available.

FIG. 10 is a schematic view of a method 1000 for inferring GPS location when a device is only able to receive a signal from one GPS satellite. This process begins at step 1002, where an initial GPS location is recorded. This initial GPS location may be recorded at a time when the device has access to multiple satellites. From this known GPS location, the device may track the approximate path taken by the device using information from acceleration sensors (that is, using acceleration information 706) in step 1004. The approximate path may be determined by dead reckoning, for example. Other information that could be used to determine the approximate path (that is, approximate heading and speed) taken by the device include gyroscopic information 708 and/or information from a magnetometer.

Next, in step 1006, information from one GPS signal could be used to determine a set of candidate locations. Using only one GPS signal, the set of candidate locations includes all points along a circle or ellipse.

In step 1008, the most likely GPS location can be determined from the set of candidate GPS locations and the approximate path from the initial GPS location. Specifically, the most likely GPS location may correspond with the location where the approximate path of the device intersects the ellipse of candidate GPS locations. In other embodiments, the approximate path may be used as one factor in determining a likely candidate. In some embodiments, the approximate path could be used along with other kinds of information described above and shown in FIG. 7 in order to assign probabilities to candidate GPS locations.

Figure 11:
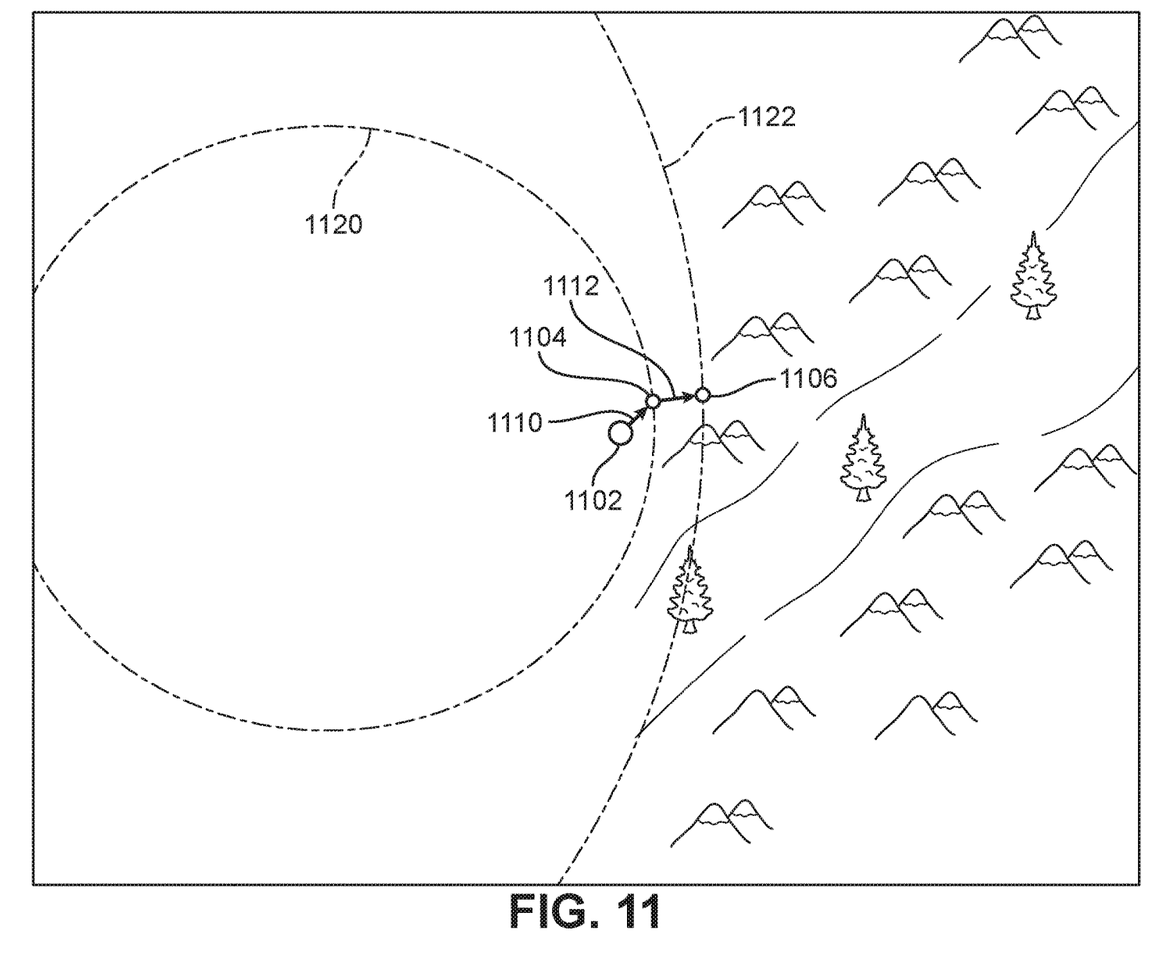
FIG. 11 is a schematic view of GPS location being determined using dead-reckoning with a single GPS signal, according to an embodiment.

FIG. 11 is a schematic view of a process for estimating a probable GPS location using the method describe above. In this example, a user has an initial known location 1102 that is determined using two or more GPS satellites. In some cases, this initial known location, or "fixed" location, may be determined using the method described above for determining a GPS location using two GPS satellites and additional geographic information. In other cases, this initial known location may be determined using three or more GPS satellites.

As the user begins moving into a new geographic area with mountains, the GPS signals may become more intermittent so that only a signal from one GPS satellite is generally available at any given time. As described above, a single GPS signal provides a set of candidate solutions arranged as a curve (such as an ellipse). In order to determine the exact location on the curve, the system uses dead-reckoning vectors (or heading vectors) from a prior known location to estimate the most likely location along the ellipse. Specifically, the system uses heading information and/or velocity information received from acceleration sensors.

For example, in FIG. 11, a user may move from known location 1102 along a direction coinciding with a first dead-reckoning vector 1110. As a first GPS signal is received, the system determines a first set of candidate locations 1120 (which form an ellipse). Then, the system determines where the first dead-reckoning vector 1110 crosses first set of candidate locations 1120. In this case, the two intersect at a first estimated location 1104. This same process is performed again as the user moves along a second dead-reckoning vector 1112. As a second GPS signal is received, the system determines a second set of candidate locations 1122 (which form a segment of an ellipse). Then, the system determines where the second dead-reckoning vector 1112 crosses second set of candidate locations 1122. In this case, the two intersect at a second estimated location 1106. This same process may be continued indefinitely, and at any suitable intervals of time assuming the GPS signal of at least one satellite is always available. At a later time, when two or more signals are available, additional information can be used to provide any updated "known location" that has a higher probability due to the presence of additional information.

Although the present embodiment shows an example where a user travels along straight paths parallel with a single dead-reckoning vector between locations, in other embodiments, the path traveled by a user between locations could be non-linear. In such cases, the path of the user from the last location can still be determined using acceleration information. Thus, to determine an estimated location, the system could look for the intersection of such a path and a curve representing a set of candidate GPS positions determined from a single GPS signal.

In some cases, a similar method could be used to generate an estimated GPS location that improves with time even if the user is stationary when only one GPS signal is available at a time. In that case, the dead-reckoning vector is zero so the system may look at the intersections of the candidate locations (curves) for each subsequent GPS signal received. This allows the system to generate a most likely GPS location that improves with time and with the number of occasional signals collated to the last dead reckoning position of the mobile device.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of inferring GPS location on a two-dimensional surface for a device including a GPS receiver and an acceleration sensor, the two-dimensional surface having known spatial coordinates and being associated with a geographic area, the method comprising steps of:
   receiving a first GPS signal from a first GPS satellite and determining, using information from the first GPS signal, that the device lies on a first circle of points that are equidistant from the first GPS satellite and that also lie on the two-dimensional surface;
   receiving a second GPS signal from a second GPS satellite and determining, using information from the second GPS signal, that the device lies on a second circle of points that are equidistant from the second GPS satellite and that also lie on the two-dimensional surface;
   assigning a first candidate GPS location to a first intersection of the first circle and the second circle and assigning a second candidate GPS location to a second intersection of the first circle and the second circle;
   retrieving geographic information corresponding to the first candidate GPS location and to the second candidate GPS location, wherein the geographic information includes locations of roads associated with the geographic area;
   determining that the first candidate GPS location is on a road based on the geographic information and determining that the second candidate GPS location is not on any road based on the geographic information;
   retrieving acceleration information from the acceleration sensor of the device;
   determining whether or not the acceleration information is consistent with driving on the road;
   wherein, when the acceleration information is determined to be consistent with driving on the road, determining that the device is at the first candidate GPS location; and
   wherein, when the acceleration information is determined to not be consistent with driving on the road, determining that the device is at the second candidate GPS location.

2. The method according to claim 1, wherein the method further includes receiving ambient light information.

3. The method according to claim 1, wherein the method further includes receiving barometric information.

4. The method according to claim 1, wherein the method further includes receiving historical GPS information for the GPS receiver.

5. The method according to claim 1, wherein the method further includes retrieving a set of GPS locations along the road.

6. The method according to claim 1, wherein the device is a smartphone.

7. The method according to claim 1, wherein the device is part of a navigation system in a motor vehicle.

8. A method of inferring GPS location on a two-dimensional surface for a device, the device including a GPS receiver and an ambient light sensor, the two-dimensional surface having known spatial coordinates and being associated with a geographic area, the method comprising steps of:

receiving a first GPS signal from a first GPS satellite and determining, using information from the first GPS signal, that the device lies on a first circle of points that are equidistant from the first GPS satellite and that also lie on the two-dimensional surface;

receiving a second GPS signal from a second GPS satellite and determining, using information from the second GPS signal, that the device lies on a second circle of points that are equidistant from the second GPS satellite and that also lie on the two-dimensional surface;

assigning a first candidate GPS location to a first intersection of the first circle and the second circle and assigning a second candidate GPS location to a second intersection of the first circle and the second circle;

retrieving geographic information corresponding to the first candidate GPS location and to the second candidate GPS location;

receiving sensed ambient light information from the ambient light sensor; and using the geographic information and the sensed ambient light information to determine that the user is more likely to be located at the first candidate GPS location than at the second candidate GPS location.

9. The method according to claim 8, wherein using the geographic information and the sensed ambient light information further includes inferring that a user is outdoors.

10. The method according to claim 8, wherein using the geographic information and the sensed ambient light information further includes inferring that a user is indoors.

11. The method according to claim 8, wherein the method further includes receiving historical GPS information for the GPS receiver.

12. The method according to claim 8, wherein the method further includes:

receiving barometric information;

determining that the first candidate GPS location is on a mountain based on the geographic information and determining that the second candidate GPS location is not on a mountain based on the geographic information;

determining whether or not the barometric information is consistent with being on the mountain;

wherein, when the barometric information is determined to be consistent with being on the mountain, determining that the device is at the first candidate GPS location; and wherein, when the barometric information is determined to not be consistent with being on the mountain, determining that the device is at the second candidate GPS location.

13. The method according to claim 8, wherein the device is a smartphone.

14. A system for inferring GPS location on a two-dimensional surface associated with a geographic area for a device including a GPS receiver and an acceleration sensor, the two-dimensional surface having known spatial coordinates and being associated with a geographic area, the system comprising:

a device processor;

a non-transitory computer readable medium storing instructions that are executable by the device processor to:

receive a first GPS signal from a first GPS satellite and determine, using information from the first GPS signal, that the device lies on a first circle of points that are equidistant from the first GPS satellite and that also lie on the two-dimensional surface;

receive a second GPS signal from a second GPS satellite and determine, using information from the second GPS signal, that the device lies on a second circle of points that are equidistant from the second GPS satellite and that also lie on the two dimensional surface;

assign a first candidate GPS location to a first intersection of the first circle and the second circle and assigning a second candidate GPS location to a second intersection of the first circle and the second circle;

retrieve geographic information corresponding to the first candidate GPS location and to the second candidate GPS location, wherein the geographic information includes locations of roads associated with the geographic area;

determine that the first candidate GPS location is on a road based on the geographic information and determine that the second candidate GPS location is not on any road based on the geographic information;

retrieve acceleration information from the acceleration sensor of the device;

determine whether or not the acceleration information is consistent with driving on the road;

wherein, when the acceleration information is determined to be consistent with driving on the road, determine that the device is at the first candidate GPS location; and wherein, when the acceleration information is determined to not be consistent with driving on the road, determine that the device is at the second candidate GPS location.

15. The system according to claim 14, wherein the instructions are further executable to receive historical GPS information for the GPS receiver.

16. The system according to claim 14, wherein the instructions are further executable to retrieve a set of GPS locations along the road.

17. The system according to claim 14, wherein the instructions are further executable to receive ambient light information.

18. The system according to claim 14, wherein the instructions are further executable to receive barometric information.

19. The system according to claim 14, wherein the device is a smartphone.

20. The system according to claim 14, wherein the device is part of a navigation system in a motor vehicle.

* * * * *